(12) United States Patent
Sadowski et al.

(10) Patent No.: US 6,862,028 B2
(45) Date of Patent: Mar. 1, 2005

(54) BIN POINTER AND STATE CACHING APPARATUS AND METHOD

(75) Inventors: Jonathan B. Sadowski, West Sacramento, CA (US); Aditya Navale, El Dorado, CA (US)

(73) Assignee: Intel Corporation, Santa Clara, CA (US)

( * ) Notice: Subject to any disclaimer, the term of this patent is extended or adjusted under 35 U.S.C. 154(b) by 144 days.

(21) Appl. No.: 10/074,033

(22) Filed: Feb. 14, 2002

(65) Prior Publication Data

US 2003/0151602 A1 Aug. 14, 2003

(51) Int. Cl.[7] .................................................. G09G 5/36
(52) U.S. Cl. .................................... 345/557; 711/118
(58) Field of Search .......................... 345/553, 557, 345/564, 501, 530, 531, 556; 711/118, 126–130, 145, 144

(56) References Cited

U.S. PATENT DOCUMENTS

| | | | |
|---|---|---|---|
| 6,160,559 A | | 12/2000 | Omtzigt |
| 6,219,058 B1 | | 4/2001 | Trika |
| 6,247,094 B1 | | 6/2001 | Kumar et al. |
| 6,272,597 B1 | | 8/2001 | Fu et al. |
| 6,608,625 B1 | * | 8/2003 | Chin et al. .................. 345/501 |
| 2003/0093623 A1 | * | 5/2003 | Crook et al. ................ 711/133 |

* cited by examiner

Primary Examiner—Kee M. Tung
(74) Attorney, Agent, or Firm—Sharon Wong

(57) ABSTRACT

A computer graphics system is provided that includes a memory to store image data, a bin pointer list to store information regarding a plurality of image subscenes, and a pointer cache system to maintain data regarding the plurality of image subscenes. The pointer cache system may include a tag array section, a data array section and a decoupling section.

16 Claims, 8 Drawing Sheets

FIG. 7

| Bin 0 | Bin 4 | Bin 8 | Bin 12 |
| Bin 1 | Bin 5 | Bin 9 | Bin 13 |
| Bin 2 | Bin 6 | Bin 10 | Bin 14 |
| Bin 3 | Bin 7 | Bin 11 | Bin 15 |
| Bin 32 | Bin 36 | Bin 40 | Bin 44 |
| Bin 33 | Bin 37 | Bin 41 | Bin 45 |
| Bin 34 | Bin 38 | Bin 42 | Bin 46 |
| Bin 35 | Bin 39 | Bin 43 | Bin 47 |

BIN POINTER AND STATE CACHING APPARATUS AND METHOD

FIELD

The present invention relates to the field of computer graphics. More particularly, the present invention relates to techniques for communicating graphical data in a computer system.

BACKGROUND

A technique known as "chunking" has been used in the field of three-dimensional (3-D) computer graphics to improve the performance of graphics subsystems. In chunking, a complete display may be divided into a number of portions, called "chunks", and the display may be rendered one chunk at a time. A chunk may be, for example, a 32-by-32 pixel portion of the display. An advantage of chunking is that a chunk is generally small enough to be stored on chip (i.e., on the graphics accelerator/controller). Also, chunking may reduce the bus bandwidth requirements between a video memory and a rasterizer, which is the primary bottleneck in most conventional 3-D graphics subsystems. However, chunking generally achieves these benefits at the expense of increased host-to-controller data traffic and increased video memory requirements for geometry data.

Graphics data is generally represented using sets of primitives, such as polygons and/or lines. A triangle is a commonly used primitive, for example. Each triangle has a "span", which can be defined as the set of chunks overlapped by the triangle's bounding rectangle. Traditional chunking approaches allocate a bin (of triangles) for each chunk of the display. Consequently, a triangle to be rendered is assigned to each bin that corresponds to a chunk in the triangle's span. Thus, if a triangle's span includes five chunks, for example, the triangle is assigned to the bins corresponding to each of those five chunks. The host then directs the graphics controller to process the associated bin for each chunk. The problem with this approach is that the host must deliver a triangle to the graphics controller once for each chunk in the triangle's span. Thus, if a triangle's span includes N chunks, the host delivers that triangle to the graphics controller N times. In addition, the triangle data is replicated in video memory N times, once in each of the N bins.

Therefore, it is desirable to have a 3-D computer graphics technique that not only reduces video memory requirements and video memory-to-rasterizer bandwidth requirements but also reduces bandwidth requirements between the host and the graphics controller.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and that the invention is not limited thereto.

The following represents brief descriptions of the drawings in which like reference numerals represent like element and wherein:

FIG. 7 illustrates bin arrangements within a scene according to an example embodiment of the present invention.

DETAILED DESCRIPTION

Figure 1:
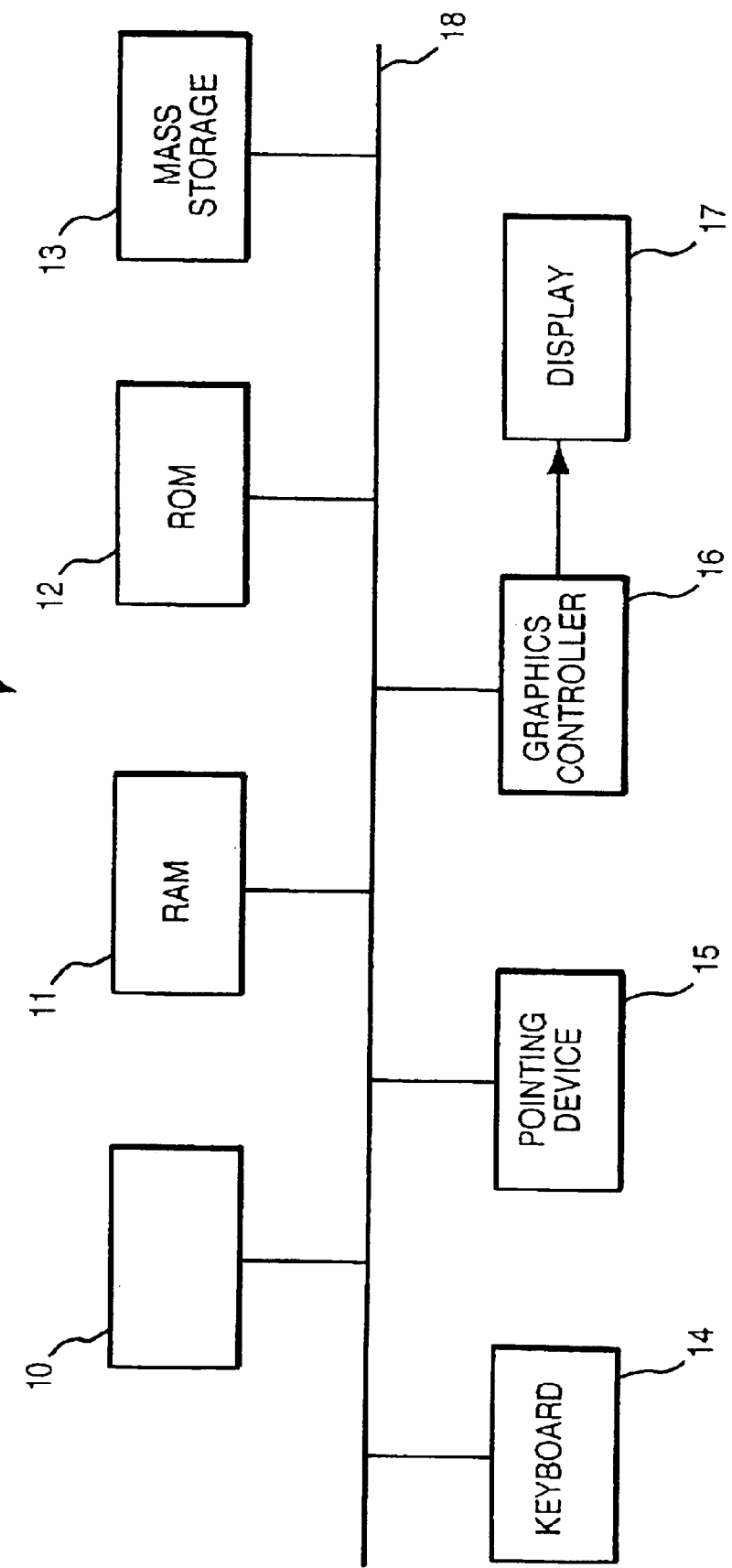
FIG. 1 is a block diagram illustrating an example computer system.

In the following detailed description, like reference numerals and characters may be used to designate identical, corresponding or similar components in differing figure drawings. Example values may be given, although the present invention is not limited to the same. Further, arrangements may be shown in block diagram form in order to avoid obscuring the invention, and also in view of the fact that specifics with respect to implementation of such block diagram arrangements may be highly dependent upon the platform within which the present invention is to be implemented. That is, such specifics should be well within the purview of one skilled in the art. Where specific details are set forth in order to describe example embodiments of the invention, it should be apparent to one skilled in the art that the invention can be practiced without, or with variation of, these specific details. Differing combinations of hard-wired circuitry and software instructions may be used to implement embodiments of the present invention. That is, the present invention is not limited to any specific combination of hardware and software.

FIG. 1 illustrates a computer system 5 according to one arrangement. Other arrangements are also possible. The computer system 5 may include a processing unit 10, random access memory (RAM) 11, read-only memory (ROM) 12, and a mass storage device 13, each coupled to a bus 18. The bus 18 may include one or more physical buses interconnected by various bridges, controllers and/or adapters. A keyboard 14, a pointing device 15, and a graphics controller 16 may also be coupled to the bus 18. The graphics controller 16 may also be coupled to a display device 17 of the computer system. In general, graphical data is generated, maintained, and manipulated by the host processing unit 10 and provided to the graphics controller 16 for rendering.

The display device 17 may be any device suitable for displaying data visually to a user, such as a cathode ray tube (CRT), liquid crystal display (LCD), or the like. The mass storage device 13 may be any device suitable for storing large volumes of data in a non-volatile manner, such as a magnetic, optical, or magneto optical (MO) storage device (e.g., magnetic disk, CD-ROM, CD-R, DVD, etc.). The pointing device 15 may be any device suitable for positioning a cursor, or pointer, on a display device such as a mouse, trackball, stylus with light pen, touch-sensitive display screen, audio input device in combination with voice recognition software, etc.

Figure 2:
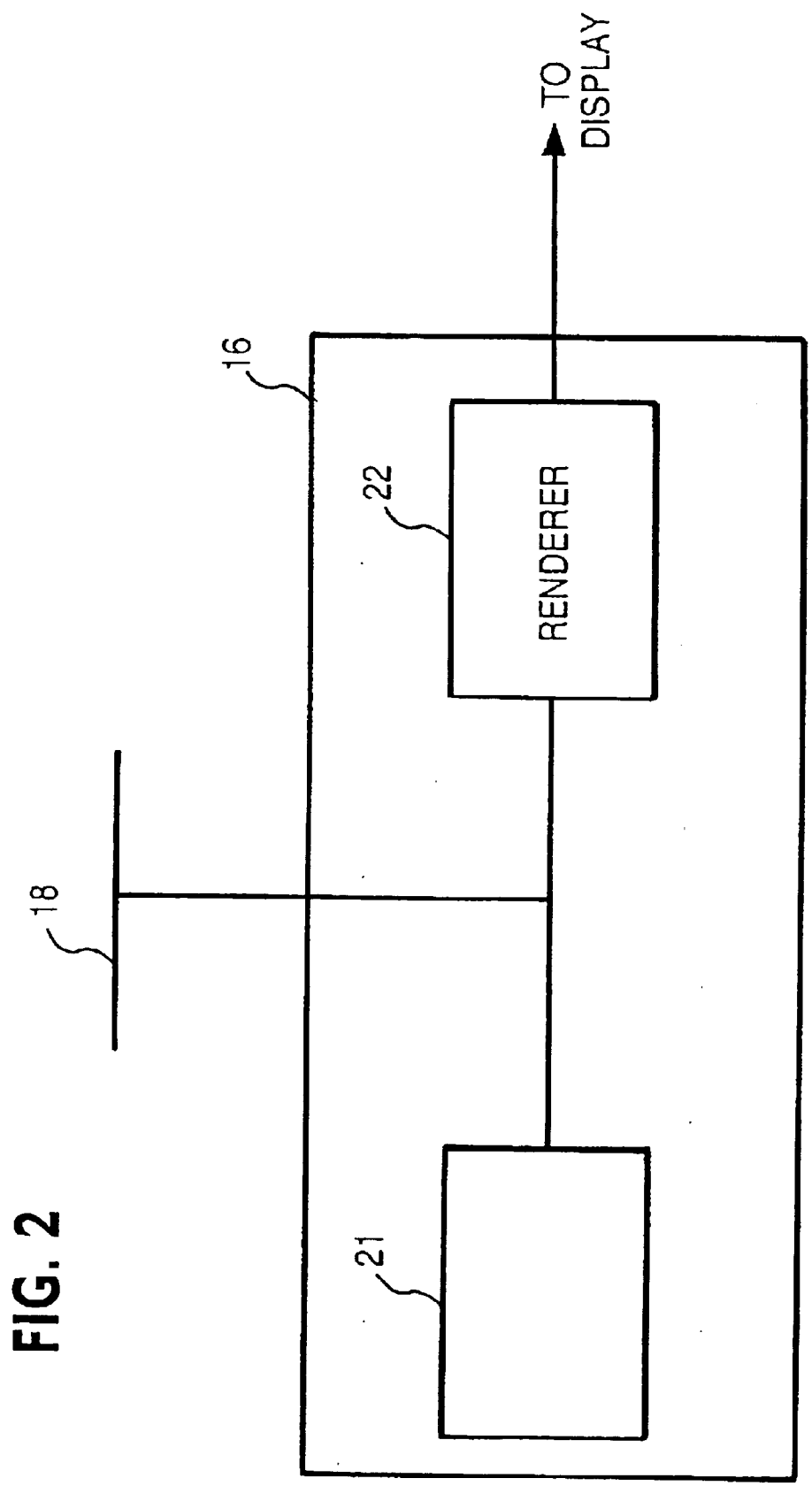
FIG. 2 is a block diagram illustrating components of the graphics controller of FIG. 1.

FIG. 2 illustrates the graphics controller 16 according to one arrangement. Other arrangements are also possible. The graphics controller 16 may include memory 21 for storing graphics data to be rendered and a renderer 22 that provides rasterized data to the display device 17. The memory 21 and the renderer 22 may each be coupled (directly or indirectly) to the bus 18. In this arrangement, the bus 18 may include a conventional peripheral bus, such as the Peripheral Component Interconnect (PCI) bus. As already noted, traditional chunking techniques may attempt to reduce the bandwidth requirements between the memory 21 and the renderer 22. However, these techniques may be at the expense of higher bandwidth requirements between the graphics controller 16 and other components of the computer system 5 (particularly the processing unit 10 and the RAM 11) and higher storage capacity requirements for the memory 21. Therefore, bandwidth requirements may be reduced between the memory 21 and the renderer 22 as well as reduce bandwidth requirements between the graphics controller 16 and the other components of the computer system 5 and reduce storage capacity requirements on the memory 21.

Figure 3A:
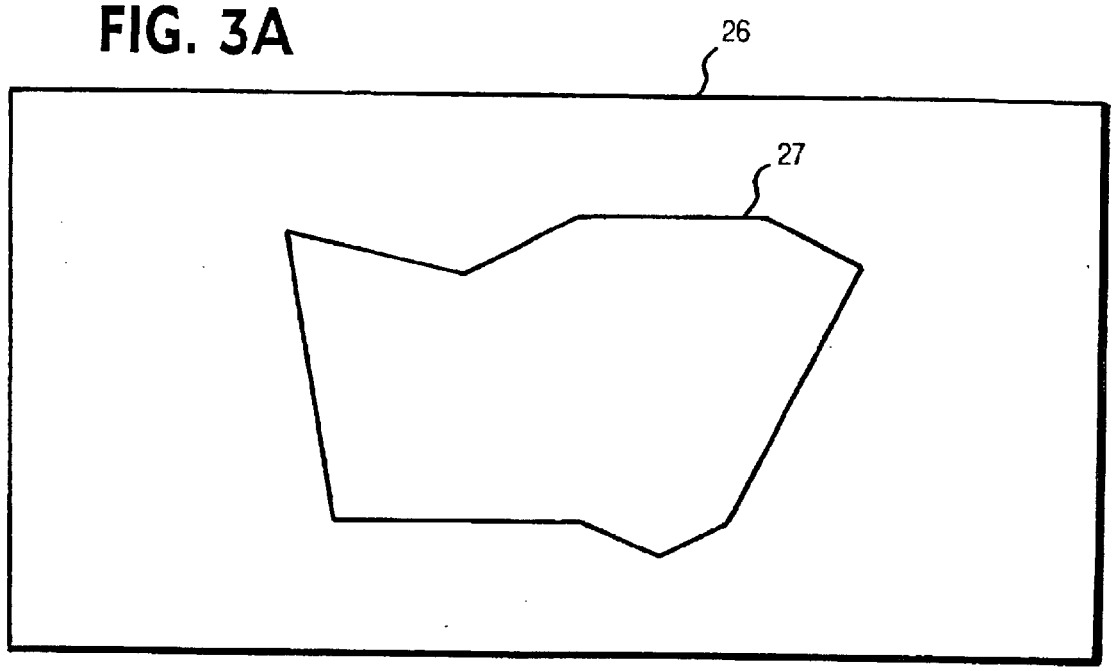
FIGS. 3A and 3B illustrate the representation of a displayable object as a set of triangles.
Figure 3B:
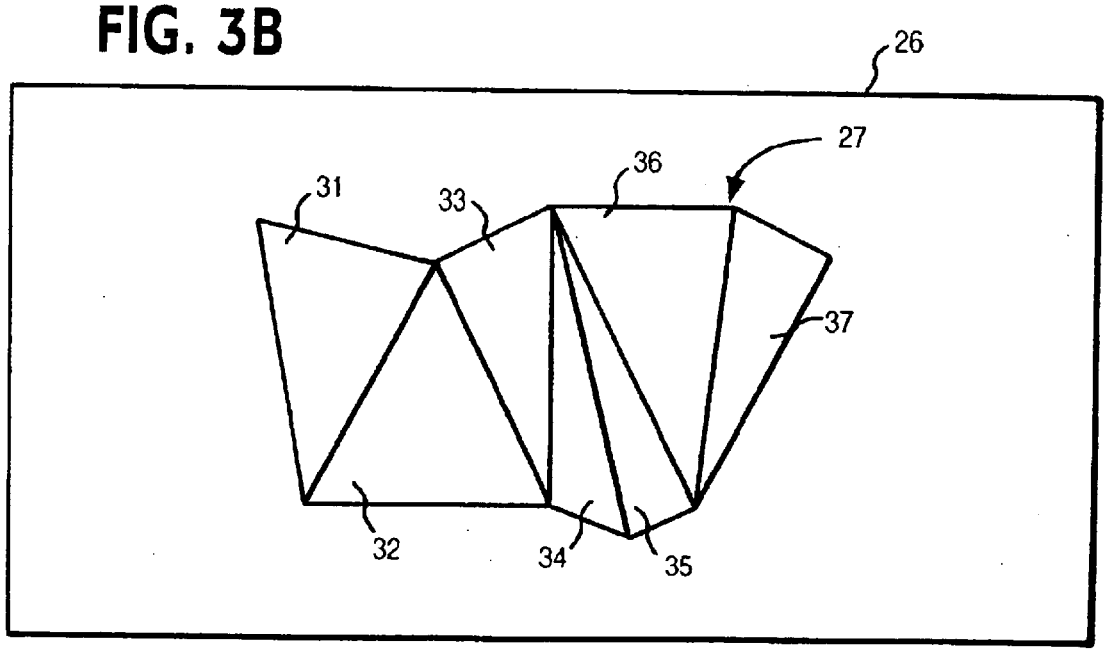

FIG. 3A illustrates an object 27 depicted on a display 26. FIG. 3B illustrates that the object 27 can be represented as a number of triangles 31 through 37 using conventional computer graphics techniques.

Binning (or chunking) may take a scene (i.e., a rectangular image surface created from a list of polygons that describe an image) and break down the scene into many smaller scenes (i.e., rectangular image surfaces that are subsets of the original scene). For each smaller scene (hereafter also called subscenes), the system may examine the entire original list of polygons and appropriately bin the polygons. Each subset scene has a corresponding bin. A bin is a new list (subset) of polygons created from the original scene such that the subset of polygons in a particular bin are those polygons that affect the outcome of the smaller subset scene.

Figure 4A:
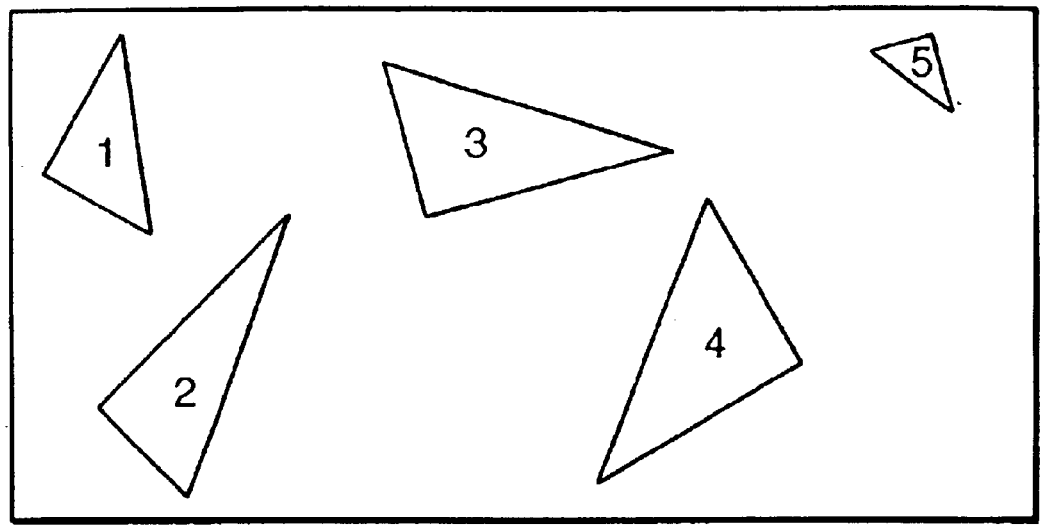
FIG. 4A illustrates a scene having five triangular polygons.
Figure 4B:
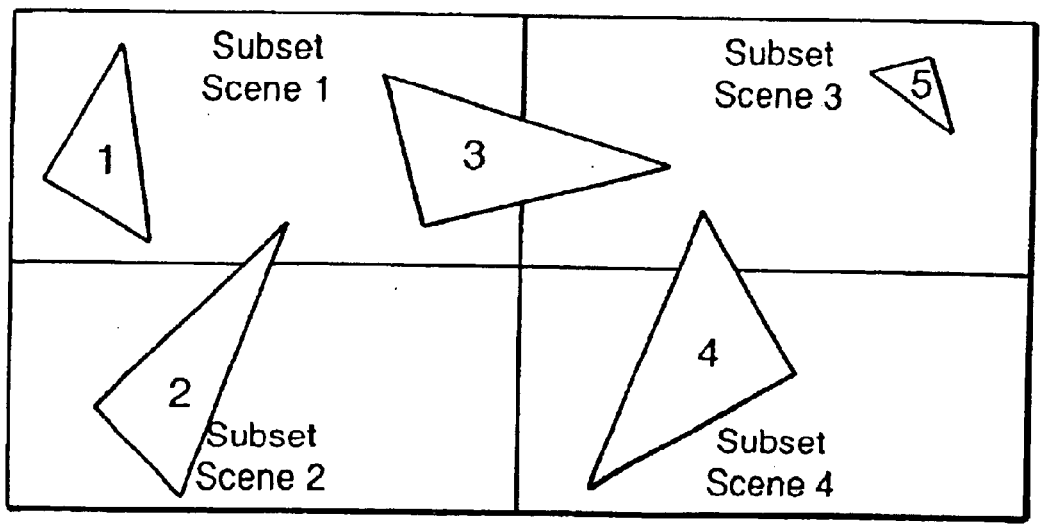
FIG. 4B illustrates the scene of FIG. 4A divided into four subset scenes.
Figure 4C:
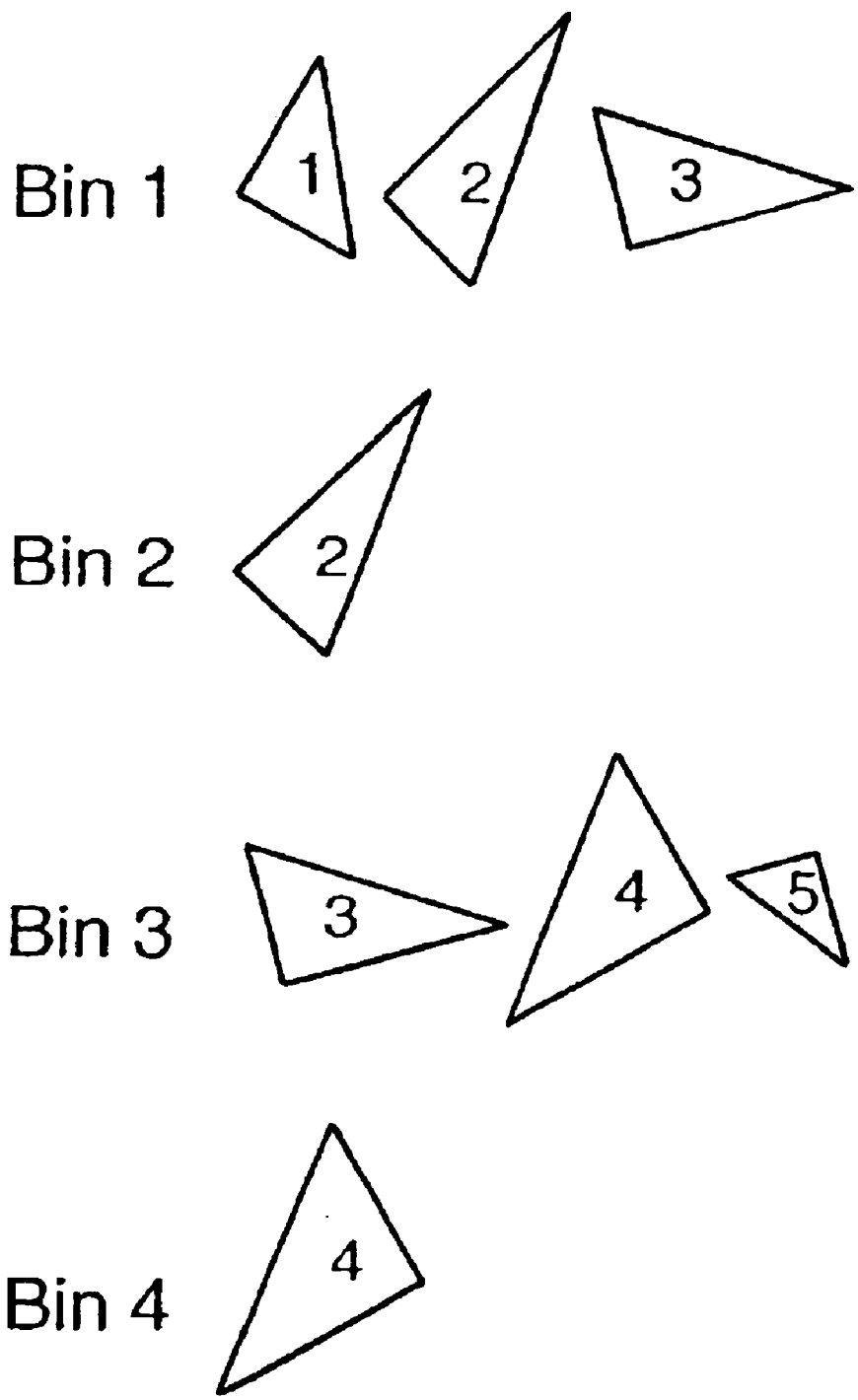
FIG. 4C illustrates the bins for each subset scene in FIG. 4B.

FIG. 4A is a pictorial example showing a scene made of five triangular polygons labeled 1–5. FIG. 4B shows the scene divided into four subset scenes 1–4. Each subset scene has a corresponding bin containing the polygons that affect that particular subset scene. For example, the subset scene 1 includes the polygons 1, 2 and 3, the subset scene 2 includes the polygon 2, the subset scene 3 includes the polygons 3, 4 and 5, and the subset scene 4 includes the polygon 4. As can be seen in FIG. 4C, the bin 1 includes the polygons 1, 2 and 3, the bin 2 includes the polygon 2, the bin 3 includes the polygons 3, 4 and 5 and the bin 4 includes the polygon 4. The polygon 2 is replicated in both bins 1 and 2, the polygon 3 is replicated in both bins 1 and 3, and the polygon 4 is replicated in both bins 3 and 4.

Figure 5:
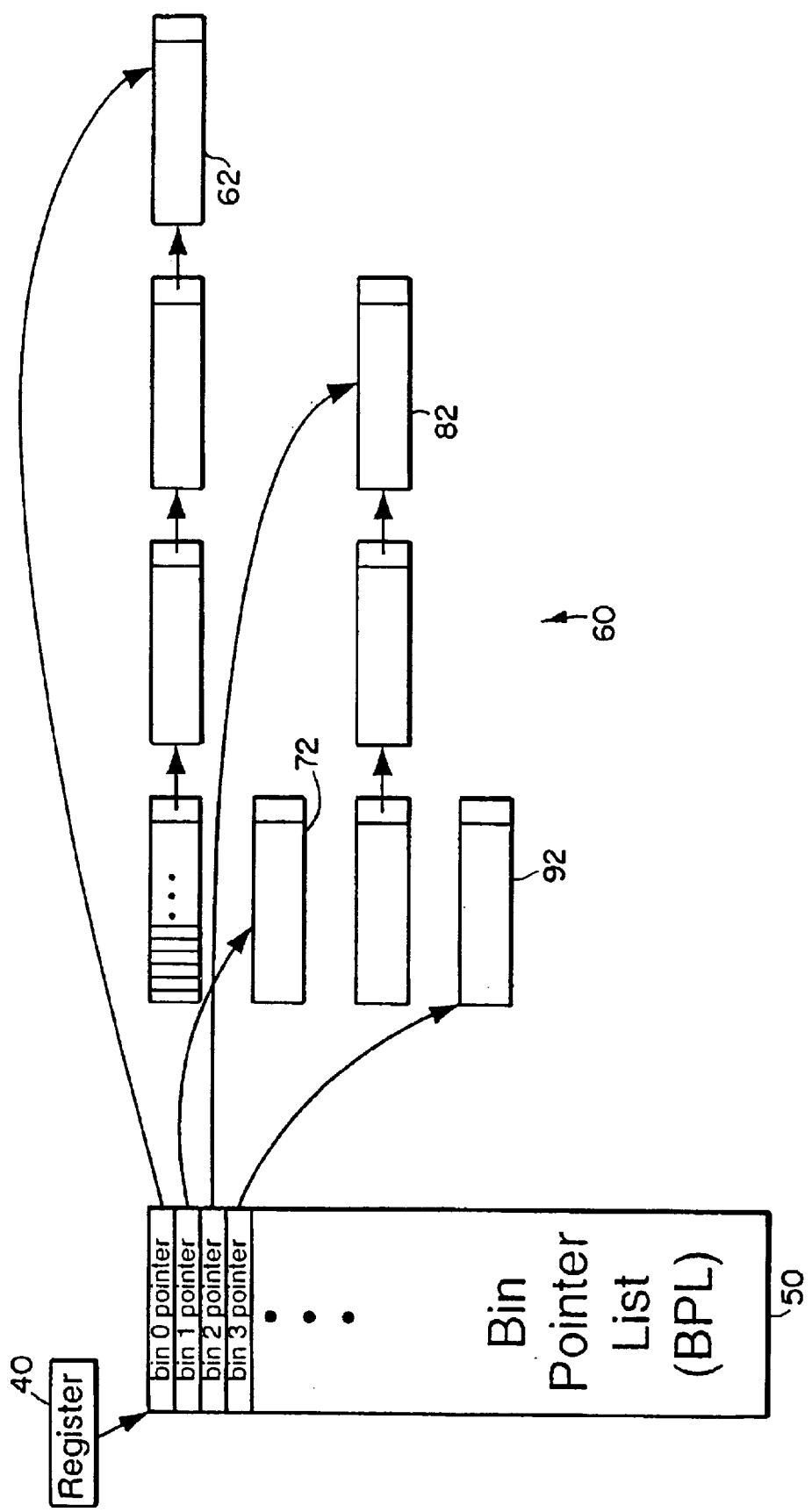
FIG. 5 illustrates a bin pointer list and linked lists of physical memory pages.

FIG. 5 illustrates a bin list and a linked list according to one arrangement. Other arrangements are also possible. A bin list may be a linked list of physical memory pages containing the descriptions for polygons and state information required to render a scene. A bin pointer list (BPL) 50 may be used in order to create and maintain the bin lists. The address of the BPL 50 in physical memory may be stored in an on-chip register 40. The contents of the BPL 50 are physical memory pointers (addresses) and state information describing information about each individual bin. For example, the BPL 50 may contain a Bin 0 pointer, a Bin 1 pointer, a Bin 2 pointer, and a Bin 3 pointer. Other pointers may be provided but their description will be omitted for sake of clarity. Each bin pointer may identify a next address at which data is to be stored for that particular bin. The Bin 0 pointer may point to a physical memory page 62, the Bin 1 pointer may point to a physical memory page 72, the Bin 2 pointer may point to a physical memory page 82 and the Bin pointer 3 may point to a physical memory page 92. As shown in FIG. 5, the physical memory page 62 may be the last page in a linked list of physical memory pages (e.g. three previous pages), the physical memory page 72 may be the last page in a linked list of physical memory pages (e.g. two previous pages), the physical memory page 82 may be the last page in a linked list of physical memory pages (e.g. two previous pages) and the physical memory page 92 may be the only page in a linked list of physical memory pages.

The bin lists contain the polygon data required to render each separate subset scene. The process of binning takes the polygons from the original scene (such as FIG. 4A) and calculates into which bins each particular polygon needs to be written (as shown in FIGS. 4B and 4C). The next location in a bin where polygon data should be written is stored as an address in the BPL 50. Therefore, as the graphics controller reads each polygon description from the original scene list (FIG. 4A), the graphics controller calculates which bin it falls in. In FIG. 5, the next location for Bin 0 is physical memory page 62, the next location for Bin I is physical memory page 72, the next location for Bin 2 is physical memory page 82 and the next location for Bin 3 is physical memory page 92. The graphics controller then reads the information in the BPL 50 for that particular bin so as to determine the location in the physical memory where the data should be written. After writing the data in the memory, the graphics controller writes an updated address back into the BPL 50 describing where the next polygon for that particular bin should be written. This process inherently requires a considerable amount of memory bandwidth. That is, for each polygon read from the original scene, at a minimum the following functions may be performed: a read (of the address) from the BPL 50; a write of the polygon data into the appropriate bin; and a write (of the new address) back into the BPL 50. This becomes more complicated if a polygon falls across multiple subset scenes. In that circumstance then the last steps may have to be repeated for each bin that the polygon intersects (such as both bins 1 and 2 for the polygon 2). The multiple BPL reads and writes not only increase memory bandwidth, but also increase the latency for binning as well as the latency for other memory clients.

Embodiments of the present invention may provide a pointer cache (or pointer cache system) implemented in the graphics controller to store the most recent accesses to the BPL 50. This may help eliminate the reads and writes of the BPL 50 from the memory bandwidth and thereby consequently improve both the binner as well as other memory client memory latencies.

As is well known, a cache is a relatively small high-speed memory. A cache may bridge the gap between fast processor cycle time and slow memory access time. When instructions are provided to the cache, the cache may check its contents to determine if the desired data is present. If the data is already present in the cache (called a "hit"), then the data may be forwarded back to the requesting device. If, however, the data is not present (called a "miss"), then the cache may retrieve the data from another memory source such as the main memory. In addition, the retrieved information is also copied (i.e., stored) into the cache memory so that it is readily available to the requesting device for future use.

The cache may have a tag subsystem (also called a cache tag array) and a memory subsystem (also called a cache data array). The tag subsystem may hold the addresses and determine when there is a match for requested data. The memory subsystem stores and delivers the data upon request. Thus, each tag entry may be associated with a data array entry, where each tag entry stores index information relating to each data array entry.

Figure 6:
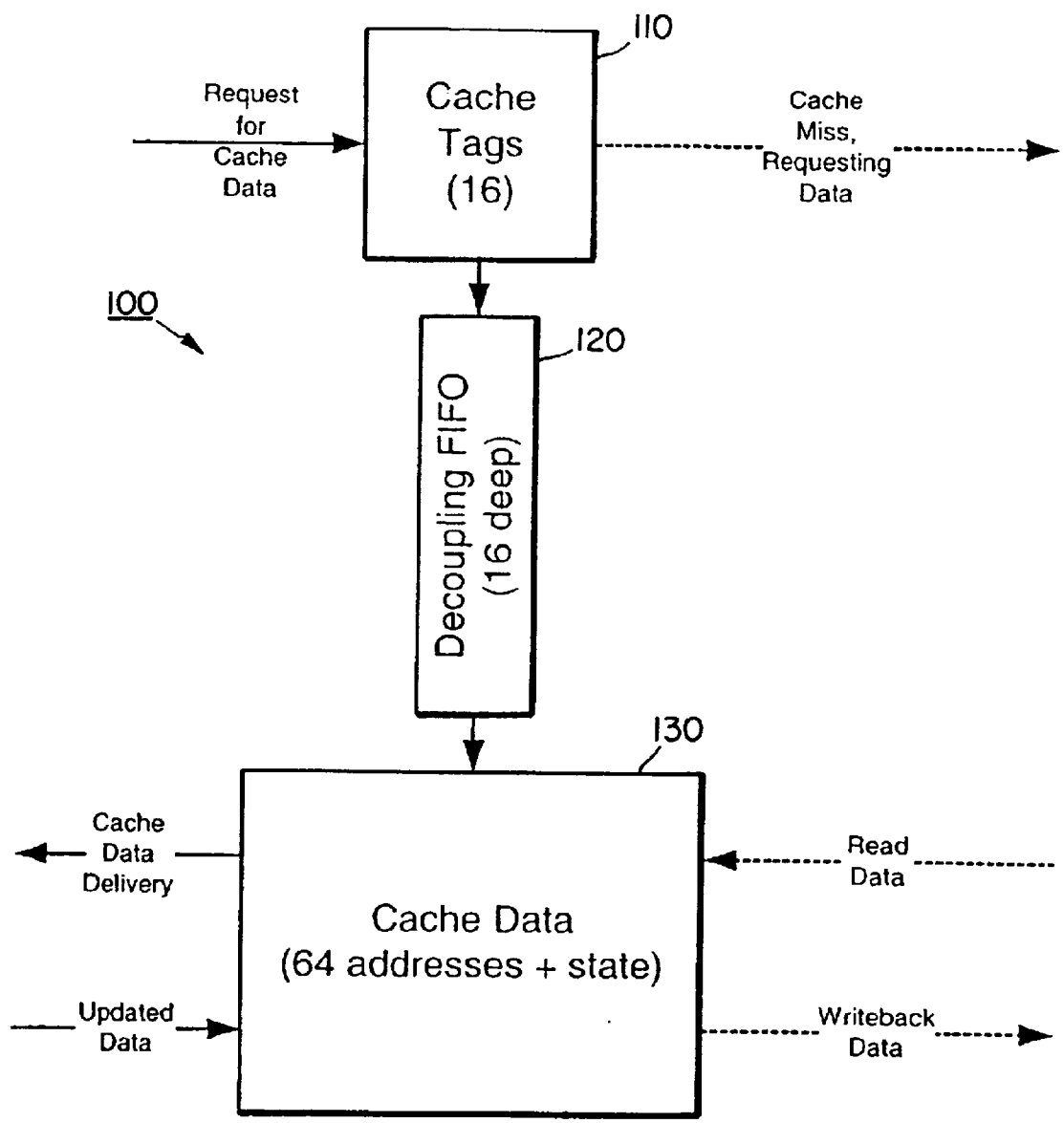
FIG. 6 illustrates a pointing cache system according to an example embodiment of the present invention.

FIG. 6 illustrates a pointer cache 100 according to an example embodiment of the present invention. Other embodiments and configurations are also within the scope of the present invention. More particularly, FIG. 6 shows a pointer cache 100 that includes a cache tag array section 110, a cache decoupling FIFO section 120 and a cache data array section 130. The pointer cache may relate to 16 tags (or entries), for example. Other numbers of tags or entries are also within the scope of the present invention. Because the memory request size may be fixed (i.e., the amount of data returned from memory with each request), each entry within the cache may contain the data for 4 pointers within the BPL 50. Therefore, in this example, the cache may store 64 pointers and their corresponding states. The cache tags (within cache tag array section 110) may be separated from the cache data (within in the cache data array section 130) by the 16 level cache decoupling FIFO section 120. The cache decoupling section 120 creates a non-blocking cache in which the cache does not wait for the data to return. The cache may therefore hide some of the memory latency in fetching the bin pointer data.

The cache tag array section 110 may receive a request for data (shown as Request for Cache Data). The cache tag array section 110 may determine if the cache data array section 130 contains the requested data. If so, then the cache tag array 10 provides a cache hit. The cache address where the desired data is located is placed into the cache decoupling FIFO section 120. This allows the cache tag array section 110 to immediately start working on the next data request before the data for the first data request is even used. On the other hand, if the cache tag array section 110 determines a cache miss, then the data request for the missed data is made (shown as Cache Miss, Requesting Data). The data request may be forwarded to the cache decoupling FIFO section 120. While the data request is waiting in the cache decoupling FIFO section 120 (for the memory latency to return the data needed), additional miss requests may be processed. This may thereby optimize the cache performance. As shown in FIG. 6, the cache data array section 130 may receive data (shown as Read Data and Updated Data) and may deliver data (shown as Cache Data Delivery and Writeback Data).

The pointer cache system may have special handling techniques when an out-of-memory exception occurs. When creating the linked lists of physical pages that store the bin data, additional memory may need to be allocated if a physical memory page has been fully filled and more polygon data needs to be written into that particular bin. The new physical memory page allocated and linked into the existing bin list may come from a pool of free memory. This pool of memory may be drained by the binner and may be filled by the renderer as it renders previously binned scenes. If the memory pool becomes empty and the renderer is done binning previous scenes, then an out of memory exception occurs. In this circumstance, the binning cannot progress until there is more memory. To resolve this, the current bin lists may be partially rendered thereby putting discarded pages into the free memory pool. This may allow the remainder of the scene to then be binned. One problem is that the contents of the cache may get corrupted while closing the bins. The cache needs to automatically recover from this corruption. The cache gets corrupted during the bin closing operation which happens as the last process on a binned list before the bins are passed off to the renderer. The bin closing operation may fill the cache data array section 130 with data that no longer matches the information in the cache tag array section 110. Further, there may be entries in the cache decoupling FIFO section 120 that need data that was in the cache data array section 130 but is now corrupted.

The pointer cache system may perform a recovery operation if binning is resumed after an out-of-memory exception causing a partially binned scene to be rendered. The recovery operation may be as follows. Accesses to and from the cache data array section 130 may be blocked. Then, all of the bins may be closed which corrupts the cache data. All of the tags within the cache tag array section 110 may be invalidated. The pointer cache 100 may then wait for a "resume" command at which point a new BPL may be created with a new bin list for the new scene. At that point, for each entry in the cache decoupling FIFO section 120, the following operations may occur. The entry may be read out of the decoupling FIFO section 120 to determine which cache location it references. Based on the cache location, the tag structure may be read and the respective tag data may be returned to the cache tag array section 110. If the tag is valid, then the data may be fetched from the cache data array section 130 making sure to place the data in the same cache location it was in previously. That tag may then be validated and the entry may be placed back into the cache decoupling FIFO section 120. Accesses to and from the cache data array section 130 may then be unblocked.

At the end of this operation, all the bins will have been closed and a new BPL will have been created for the new scene. The tags will have been validated and the data in the cache data array section 130 will be the correct data for the new BPL. Accordingly, only those entries that are currently active in the cache (i.e., the cache decoupling FIFO section 120) will have their corresponding cache data refetched. If more than one entry in the cache decoupling FIFO section 120 hits the same location within the cache data array section 130, then that entry's data may only be fetched once.

As shown in FIG. 7, embodiments of the present invention may tile the subscenes into groups of four in a vertical direction. The grouping of four bins into one block may be dictated by the quantity of data that is returned when making the minimum sized request of the memory subsystem. This is one reason that the cache has 16 tags and stores 64 bin pointers in at least one embodiment. One reason for the vertical arrangement of bins is because the binning engine may walk vertically down subscenes when calculating where a triangle will fall. The triangle shown in FIG. 7 may be placed into bins 1, 2, 3, 4, 5 and 6. Because the binning engine walks down bins vertically, the binning engine may write the triangle's descriptive information in the order to 1, 2, 3, 4, 5, 6. This tiling optimization may allow for a better cache coherency (i.e., a higher cache hit rate).

Some embodiments of the present invention may improve 3D rendering performance while simultaneously reducing the memory bandwidth required for binning. Reducing the binning memory bandwidth may also affect overall device performance by having reduced latencies and more available bandwidth.

Some embodiments of the present invention may have one cache tag corresponding to four pieces of cache data. The cache tags may be temporarily split from the cache data. The pointer cache may be non-blocking due to the addition of the decoupling FIFO section 120. Furthermore, the pointer cache system may have a built-in recovery mechanism to take care of cache corruption.

Some embodiments of the present invention may provide a graphics controller that includes a bin pointer list containing information regarding image data for each of a plurality of subscenes and a pointer cache system to store accesses to the bin pointer list. The pointer cache system may include a cache tag array section, a cache data array section and a decoupling section.

Any reference in this specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A graphics controller comprising:
   a bin pointer list containing information regarding image data for each of a plurality of subscenes; and
   a pointer cache system to store accesses to the bin pointer list, wherein said pointer cache system further comprises a decoupling section to create a non-blocking pointer cache system and performs a recovery operation following an out of memory condition, including blocking access to the cache data array section, creating a new bin pointer list, examining entries in said decoupling section and subsequently unblocking access to the cache data array section.

2. The graphics controller of claim 1, wherein said pointer cache system comprises a cache tag array section and a cache data array section.

3. The graphics controller of claim 2, wherein each cache tag in said cache tag array section corresponds to at least four pieces of cache data in said cache data array section.

4. The graphics controller of claim 2, wherein said cache tag array section receives a data request and determines if said cache data array contains information related to said data request.

5. The graphics controller of claim 1, wherein if said cache data array contains information related to said data request then said data request is placed in said decoupling section.

6. The graphics controller of claim 1, wherein if said cache data array does not contain information related to said data request then a data request is made for the missing data and the data request is placed in said decoupling section.

7. The graphics controller of claim 1, wherein said graphic controller vertically arranges said subscenes.

8. A computer graphics system comprising:
   a memory to store image data;
   a bin pointer list to store information regarding a plurality of image subscenes; and
   a pointer cache system to maintain data regarding said plurality of image subscenes, wherein said pointer cache system comprises a tag array section and a data array section, wherein said pointer cache system further comprises a decoupling section to create a non-blocking pointer cache system and performs a recovery operation following an out of memory condition, including blocking access to the cache data array section, creating a new bin pointer list, examining entries in said decoupling section and subsequently unblocking access to the cache data array section.

9. The computer graphics system of claim 8, wherein each cache tag in said tag array section corresponds to four pieces of data in said data array section.

10. The computer graphics system of claim 8, wherein said tag array section receives a data request and determines if said data array contains information related to said data request.

11. The computer graphics system of claim 8, wherein if said data array section contains information related to said data request then said data request is placed in said decoupling section.

12. The computer graphics system of claim 8, wherein if said data array does not contain information related to said data request then a data request is made for the missing data and the data request is placed in said decoupling section.

13. The computer graphics system of claim 8, wherein said graphic controller vertically arranges said subscenes.

14. A method comprising:
    maintaining a bin pointer list containing information regarding image data for a plurality of subscenes;
    making a data request to a pointer cache system to determine if said pointer cache system contains information relating to said data request; and
    obtaining information from said pointer cache system, wherein said pointer cache system is a non-blocking cache system; and
    performing a recovery operation following an out of memory condition.

15. The method of claim 14, comprising obtaining said information from a separate memory prior to obtaining said information from said pointer cache system if said pointer cache system does not contain information relating to said data request.

16. The method of claim 14, wherein said pointer cache system comprise a cache tag array section and a cache data array section.

* * * * *

UNITED STATES PATENT AND TRADEMARK OFFICE
CERTIFICATE OF CORRECTION

PATENT NO.    : 6,862,028 B2
DATED         : March 1, 2005
INVENTOR(S)   : Sadowski et al.

Page 1 of 1

It is certified that error appears in the above-identified patent and that said Letters Patent is hereby corrected as shown below:

<u>Column 8,</u>
Line 55, after "14", insert -- further --.

Signed and Sealed this

Thirty-first Day of May, 2005

JON W. DUDAS
*Director of the United States Patent and Trademark Office*